United States Patent [19]
Umezaki et al.

[11] Patent Number: 5,472,468
[45] Date of Patent: Dec. 5, 1995

[54] EXHAUST GAS FILTER ELEMENT

[75] Inventors: Hiroshi Umezaki; Takeshi Matumoto; Akira Morii, all of Niihama, Japan

[73] Assignee: Sumitomo Chemical Company, Limited, Osaka, Japan

[21] Appl. No.: 200,463

[22] Filed: Feb. 23, 1994

[30] Foreign Application Priority Data

Feb. 25, 1993 [JP] Japan .................................. 5-036554

[51] Int. Cl.$^6$ .................................................. B01D 39/20
[52] U.S. Cl. ...................... 55/523; 55/527; 55/DIG. 30
[58] Field of Search ................. 55/523, 527, DIG. 5, 55/DIG. 30, 385.3; 60/311; 422/180

[56] References Cited

U.S. PATENT DOCUMENTS

| | | | |
|---|---|---|---|
| 4,363,644 | 12/1982 | Sato et al. | 55/DIG. 5 |
| 5,069,697 | 12/1991 | Hamaguchi et al. | 55/DIG. 30 |
| 5,098,763 | 3/1992 | Horikawa et al. | 55/523 X |
| 5,174,969 | 12/1992 | Fischer et al. | 55/523 X |
| 5,194,078 | 3/1993 | Yonemura et al. | 55/466 |
| 5,194,154 | 3/1993 | Moyer et al. | 55/523 X |
| 5,195,319 | 3/1993 | Stobbe | 55/523 X |
| 5,198,006 | 3/1993 | Mimori et al. | 55/DIG. 5 |

FOREIGN PATENT DOCUMENTS

| | | |
|---|---|---|
| 0358522 | 3/1990 | European Pat. Off. |
| 2810937 | 9/1979 | Germany. |
| 1213206 | 11/1970 | United Kingdom. |
| 1456581 | 11/1976 | United Kingdom. |
| 9206768 | 4/1992 | WIPO. |

*Primary Examiner*—Richard L. Chiesa
*Attorney, Agent, or Firm*—Birch, Stewart, Kolasch & Birch

[57] ABSTRACT

There is provided a filter element for the removal of particulates from an exhausted gas by collecting the particulates entrained with the gas characterized in that the filter element includes continuous alumina-silica fibers as inorganic fibers each of which contains not less than 98% by weight of alumina and silica and of which folding strength is not less than about 1.5 Kg/mm$^2$.

8 Claims, 1 Drawing Sheet

EXHAUST GAS FILTER ELEMENT

BACKGROUND OF THE INVENTION

1. Field of the Invention

The present invention relates to a filter element which cleans an exhausted gas. Particularly, the present invention relates to a filter element which effectively collects particulates entrained with a gas exhausted from a Diesel engine and which is also regenerable.

2. Description of the Related Art

In order to remove particulates from an exhausted gas entraining them from a Diesel engine, a heat-resistant filter element is generally located at an intermediate portion of an exhaust pipe. When such a filter element collects a given amount of the particulates, the element is required to be regenerated since plugging of the filter element due to the collected particulates increases a pressure drop across the element so that a power output from the engine is decreased. Therefore, the filter element should be regenerated at a predetermined interval.

For such a filter element, a monolithic ceramic, a ceramic foam, a metal mesh and the like are used.

However, the filter element comprising the monolithic ceramic has a problem that cracking and/or volume loss of the filter element occur due to localized heating during burning off the collected particulates for regeneration. On the other hand, the filter element comprising the ceramic foam has an insufficient collection efficiency of the particulates. Further, the filter element comprising the metal mesh is damaged because of insufficient heat resistance when it is heated so as to burn off the collected particulates.

Japanese Patent Kokai Publication No. 3-275110 (corresponding to U.S. Pat. No. 5,194,078), disclosure of which is incorporated herein by reference, discloses a ceramic filter element in the form of a corrugated honeycomb construction in which two ceramic sheets each comprises chopped aluminosilicate fibers into a length of 0.1 to 10 mm and ceramic powder, and one of the sheets is corrugated and bonded to the other planar sheet to have a composite, and such a composite is spirally wound up or a predetermined number of the composites are laminated followed by firing the composite to have an integral one.

Japanese Patent Kokai Publication No. 2-256812 (corresponding to EP-A2-0 358 522), disclosure of which is incorporated herein by reference, discloses a Diesel particulate trap comprising, in addition to electrically heating elements, ceramic fiber filter material layers and gas permeable support layers which are laminated alternately. The Publication specifically describes an embodiment in which the ceramic fibers are of alumina-boria-silica ceramic.

In the filter element described in Japanese Patent Kokai Publication No. 3-275110, its mechanical strength is not sufficient since the filter material comprises the chopped fibers and the ceramic powder. As a result, the filter element may be damaged during its use. In addition, since the fibers and the ceramic powder are not uniformly dispersed, a size distribution of an opening of the filter element is likely to be non-uniform.

In the trap described in Japanese Patent Kokai Publication No. 2-256812, a collection efficiency of the particles is high since the trap comprises continuous ceramic fibers. However, when such a trap is used so as to collect the particulates from the exhausted gas of the Diesel engine over an extended period, the fibers are broken so that the trap cannot be used any more.

SUMMARY OF THE INVENTION

Therefore, it is an object of the present invention to provide a filter element which cleans an exhausted gas, and especially a filter element which effectively collects particulates in an exhausted gas from a Diesel engine over an extended period and which is regenerated with a conventional burning manner.

The other objects of the present invention will be seen with reference to the following description.

The present inventors have made intensive studies on a filter element for an exhausted gas, and found that a filter element which comprises inorganic fibers having a specified composition and a specified folding strength achieves the above objects.

According to the present invention, there is provided a filter element for the removal of particulates from an exhausted gas by collecting the particulates entrained with the gas characterized in that the filter element comprises at least one continuous alumina-silica fiber as an inorganic fiber which contains not less than 98% by weight of alumina and silica and of which folding strength is not less than about 1.5 $Kg/mm^2$.

DETAILED DESCRIPTION OF THE PREFERRED EMBODIMENT

Figure 1:
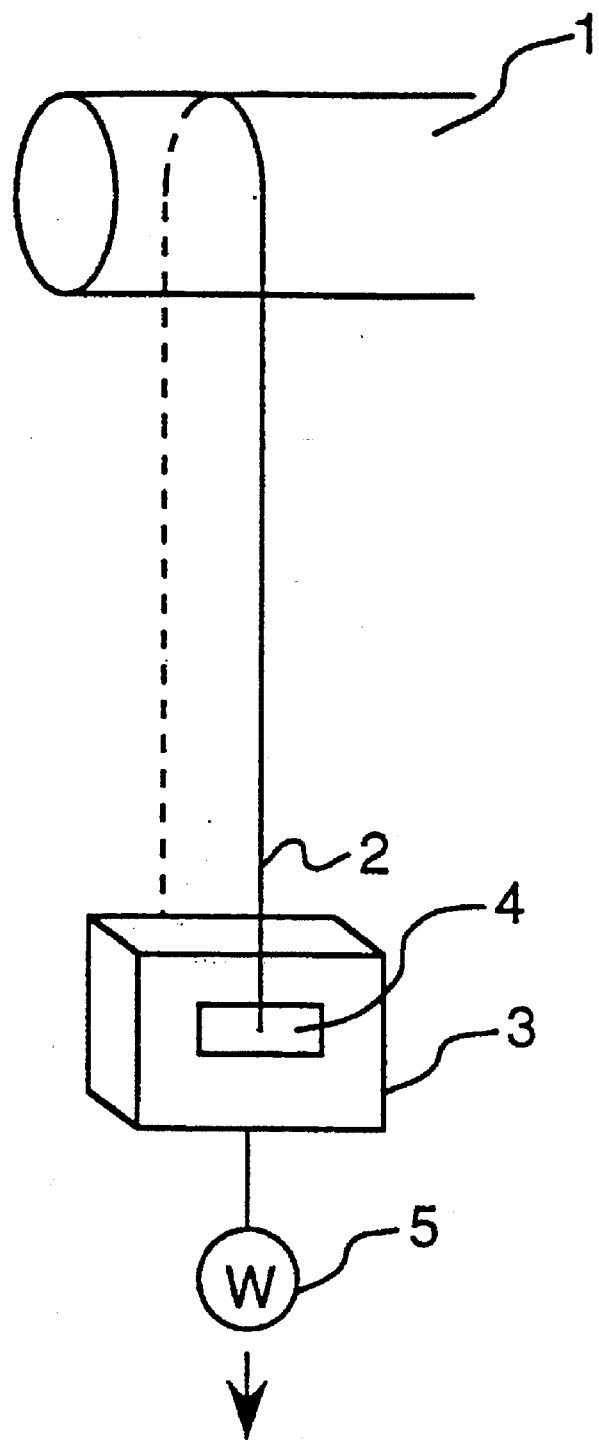
FIG. 1 schematically shows a manner how the folding strength is measured.

The present invention will be, hereinafter, described in detail.

The filter element for collecting the particulates from the exhausted gas according to the present invention is constituted of the continuous alumina-silica fibers of which total content of silica and alumina is not less than 98% by weight. In addition, the fiber has a folding strength of not less than about 1.5 $Kg/mm^2$, and preferably not less than about 2.0 $Kg/mm^2$.

When the total content of silica and alumina of the continuous fiber is less than 98% by weight, the fibers are likely to be broken when the filter element comprising such fibers is used for the trap of the Diesel particulates, whereby it is impossible to use such a trap for an extended period. Particularly, when inorganic components in the fiber include boron oxide, an alkaline metal or its oxide, an alkaline earth metal or its oxide, or the like, and the content thereof exceeds 2% by weight, the fibers are highly likely to be broken in a shorter period, so that the filter element cannot be used over an extended period.

In principle, the silica-alumina fiber used in the present filter element may include any impurities such as those described above provided that a sum of the content of silica and the content of alumina of the fiber is not less than 98% by weight and the fiber has a folding strength of not less than about 1.5 $Kg/mm^2$. In general, such fibers are commercially available, for example, from Sumitomo Chemical Co., Ltd. under the trade name of ALTEX.

In the present invention, the folding strength is defined as a force measured by a tensiometer at which the fiber is broken when it is pulled at a rate of 150 mm/min. at a temperature of 70° C. while it is folded around a metal rod over about 180° of a central angle which rod has a smoothed surface and a diameter of 0.5 mm.

The manner for the measurement of the folding strength is schematically shown in FIG. 1. Firstly, the fiber (2), or practically a plurality of the fibers of which folding strength is to be measured is hung around the rod (1) made of stainless steel having the diameter of 0.5 mm and the smoothed surface so that the fiber is placed around and in contact with the surface of an upper half of the rod in its cross section (i.e. the fiber is on the half circle of the cross section of the rod). Then, each end of the fiber is connected to either side of a plate (3) by an adhesive tape (4). Thereafter, the plate (3) is pulled downward, as shown with the arrow, at a predetermined rate (150 mm/min.) so that a force (W) is acted on the fiber until the fiber is broken, and the force at the breakage is measured as the folding strength. In FIG. 1, only a weight (5) is shown in place of the tensiometer for simplicity. The folding strength is calculated by dividing the force on the breakage with a cross-sectional area of the fiber, or a total cross sectional area of the plurality of the fibers.

When fibers having a folding strength of less than about 1.5 $Kg/mm^2$ are used, the fibers are very likely to be broken in a shorter period when they are used for the trap of the Diesel exhausted gas, so that the trap cannot be used for a long period.

The continuous alumina-silica fibers used in the present invention have a weight ratio of [alumina:silica] preferably in the range about [9:1] to [6:4], and more preferably about [9:1] to [7:3] from view points of durability and fabricability of the fiber.

The filter element according to the present invention which has a further longer life is obtained when it comprises the fiber having the tensile strength of not less than about 140 $Kg/mm^2$, preferably not less than about 150 $Kg/mm^2$ at a temperature of 20° C. after it has been heated to a temperature of 1100° C. for 100 hours in an air.

A diameter of the fiber is not particularly limited. When the fiber is thicker, the folding strength thereof is the smaller. On the basis of this, the diameter of the fiber is preferably not more than about 15 μm, more preferably in the range of about 5 to 11 μm.

There is no specific limitation on the method for the production of the fibers used in the present invention provided that the produced fibers meet the above described requirements. For example, the fibers may be produced by the polyaluminoxane method, the inorganic salt method, the sol gel method, the slurry method and the like.

There is substantially no additional essential features for the filter element of the present invention except the above specifically described requirements on the fiber which constitutes the present filter element. Thus, any known conventional art on the filter element is applicable to the present filter element.

In the present filter element, the above defined fiber may be used for the production of any design of known filter medium materials. For example, the specific fibers may be formed into the filter medium material in the form of a fabric material such as a knit or a woven textile made of a monofilament or a multifilament of the specific fiber.

Such a filter medium material comprising the specific fibers may be applied on a support substrate which is usually hollow and preferably tubular and which usually have apertures through its side surface by, for example, enclosing the substrate or by spirally winding the material around the substrate. Alternatively, the specific fiber or a bundle of such fibers may be directly wound up around the substrate surface so as to form fine openings on the substrate to have the filter element. In another embodiment, a plurality of the specific fibers are wound independently around the substrate. Optionally, any electrically heating element may be wound together with the fiber or the filter medium material includes such a heating element so that the collected particulates are burnt off so as to regenerate the filter element.

For example, when a candle type filter element as shown in Japanese Patent Kokai Publication No. 2-256812 is to be constructed, the continuous silica-alumina fibers or optionally bundles of such fibers and electrical heater elements are wound alternately around a supporting substrate made of, for example, a metal mesh or a stainless steel pipe having apertures through its side surface.

For example, when a coil type filter element is to be constructed, the design as shown in FIG. 1 in "Experiences in the Development of Ceramic Fiber Coil Particulate Traps" (Society of Automotive Engineers, 870015, pp 67–78) may be employed in which the alumina-silica fibers are crosswounded on a hollow support substrate of which one end is closed.

The filter element according to the present invention may carry any known catalyst, if desired, so as to clean the exhausted gas to so as to remove harmful components in addition to the fine particulates.

When compared with the filter element of the prior art, the filter element according to the present invention is stably used to collect the particulates from the exhaust gas such as that from the Diesel engine for a more extended period even though it is repeatedly regenerated with the conventional burning manner.

EXAMPLES

The present invention will be explained with reference to the following Examples and Comparative Examples. It should be understood that the Examples only demonstrate some embodiments of the present invention and it is not limited to those Examples.

In the Examples, the tensile strength was measured according to the following conditions using a tensile testing machine (Model UTM-II-20R manufactured by Toyo-Boldwin Co., Ltd.):

The fiber was heated to 1100° C. for 100 hours in the air, then cooled to a room temperature (about 20° C.) and then a force was measured as the tensile strength at the breakage when the fiber was pulled with a fiber length for the measurement being 25 mm and a pulling rate being 1 mm/min.

Example 1

A continuous silica-alumina fiber having the composition and the physical properties as shown in the following Table 1 was used. Namely, the fiber contained 85% by weight of alumina, 15% by weight of silica and not more than 0.1% by weight of the other inorganic materials.

The filter element of this Example was produced by winding up the continuous alumina-silica fiber around a stainless steel tube having an opening ratio of its side surface of 70% so as to have a thickness of the wound fiber layer around the tube of 5 mm.

In Table 1, the results of this Example and the following Examples of the present invention are shown in the upper side, and those of Comparative Examples which will be described below are shown in the lower side. For the folding strength, $Kg/mm^2$ unit is used; for the tensile strength, $Kg/mm^2$ unit is used; and for the fiber diameter, μm unit is used.

A filter element was produced from the fibers as described above, and examined under a repeated heating cycle between heating of the element for 10 minutes at a temperature of 30° C. and heating of the element for 10 minutes at a temperature of 1000° C. with passing an exhausted gas from a Diesel engine through the element. In this test, the exhausted gas was so passed that an initial back pressure of 10 KPa was acted on the element only when it was heated to a temperature of 1000° C. and the filter condition was observed with respect to the breakage of the fibers. The filter element according to this Example showed no change of appearance even though 3000 heating cycles were repeated.

Comparative Example 1

A continuous silica-alumina fiber having the composition and the physical properties as shown in the following Table 1 was used. Namely, the fiber contained more than 99.5% by weight of alumina and less than 0.5% by weight of silica. Using such fibers, a filter element of which construction is substantially the same as that of Example 1 was produced and subjected to the same test as in Example 1. An opening was formed in the filter element due to the breakage of the fibers on the tenth cycle.

Examples 2 to 5 and Comparative Examples 2 to 6

Various filter elements of which designs were the same as that in Example 1 were produced using the fibers each having the composition and the physical properties as shown in Table 1, and then subjected to the repeated heating test as in Example 1. The numbers of the heating cycle repeated until the filter element was broken are shown in Table 1.

It is clearly seen from Table 1 that the continuous inorganic fiber having the folding strength of about 1.5 Kg/mm² or more and the composition of 98% by weight or more of sum of alumina and silica contents provides the good filter element life for the exhaust gas having the extended period.

The following Table 2 shows the fibers used for the filter elements in the above Examples and Comparative Examples.

TABLE 2

| | |
|---|---|
| Example 1 | Altex SX-21-2K from Sumitomo Chemical Co., Ltd. |
| Example 2 | fiber produced by the polyaluminoxane method |
| Example 3 | R-1280 D from Nitivy Co., Ltd. |

TABLE 2-continued

| | |
|---|---|
| Example 4 | R-1920 B from Nitivy Co., Ltd. |
| Example 5 | fiber produced by the polyaluminoxane method |
| Com. Example 1 | Almax from Mitsui Mining Co., Ltd. |
| Com. Example 2 | Nextel 312 from Minnesota Mining and Manufacturing Co., Ltd. |
| Com. Example 3 | Nextel 440 from Minnesota Mining and Manufacturing Co., Ltd. |
| Com. Example 4 | R-960B from Nitivy Co., Ltd. |
| Com. Example 5 | SX-31-0.5K from Sumitomo Chemical Co., Ltd. |
| Com. Example 6 | fiber produced by the polyaluminoxane method |

What is claimed is:

1. A filter element for the removal of particulates from an exhausted gas by collecting the particulates entrained with the gas, wherein the filter element comprises at least one continuous alumina-silica fiber as an inorganic fiber which contains not less than 98% by weight of alumina and silica, said fiber having a folding strength that is not less than about 1.5 Kg/mm².

2. The filter element according to claim 1 wherein the folding strength of the continuous alumina-silica fiber is not less than about 2 Kg/mm².

3. The filter according to claim 1 wherein the fiber has a weight ratio of alumina to silica in a range of about 9:1 to about 6:4.

4. The filter according to claim 3 wherein the fiber has a weight ratio of alumina to silica in a range of about 9:1 to about 7:3.

5. The filter according to claim 1 wherein the fiber has a tensile strength of not less than about 140 Kg/mm² at a temperature of 20° C. after it is heated to 1100° C. for 100 hours in the air.

6. The filter according to claim 5 wherein the fiber has a tensile strength of not less than about 150 Kg/mm².

7. The filter according to claim 1 wherein the fiber has a diameter of not more than about 15 μm.

8. The filter according to claim 7 wherein the fiber has a diameter in a range of about 5 to 11 μm.

TABLE 1

| | Used Ceramic Fiber | | | | | | | Number |
|---|---|---|---|---|---|---|---|---|
| | Composition (% by weight) | | | | Folding Strength | Fiber Diameter | Tensile Strength | of Cycles Before |
| | $Al_2O_3$ | $SiO_2$ | $B_2O_3$ | Others | (Kg/mm²) | (μM) | (Kg/mm²) | Broken |
| Exam. | | | | | | | | |
| 1 | 85 | 15 | — | <0.1 | 2.2 | 10 | 200 | >3000 |
| 2 | 85 | 15 | — | <0.1 | 9.0 | 7 | 210 | >3000 |
| 3 | 70 | 30 | — | <0.1 | 20.9 | 7 | 150 | 2700 |
| 4 | 60 | 40 | — | <0.1 | 16.0 | 7 | 110 | 2100 |
| 5 | 69 | 29.5 | — | 1.5 | 19.7 | 7 | 140 | 2500 |
| Comp. Exam. | | | | | | | | |
| 1 | >99.5 | <0.5 | — | <0.1 | 0.1 | 10 | 160 | 10 |
| 2 | 62 | 24 | 14 | <0.1 | 16.2 | 11 | 80 | 85 |
| 3 | 69 | 28 | 2 | 1 | 3.5 | 11 | 160 | 420 |
| 4 | 80 | 20 | — | <0.1 | 1.1 | 9 | 110 | 630 |
| 5 | 85 | 15 | — | <0.1 | 0.5 | 20 | 180 | 115 |
| 6 | 95 | 5 | — | <0.1 | 0.3 | 10 | 170 | 70 |

* * * * *